Jan. 6, 1925.  1,521,707
A. D. OSTERHOUT
MOTOR VEHICLE STEERING WHEEL
Filed Jan. 10, 1921  2 Sheets-Sheet 1

INVENTOR.
A. D. Osterhout
BY
Hubert T. Peck
ATTORNEY.

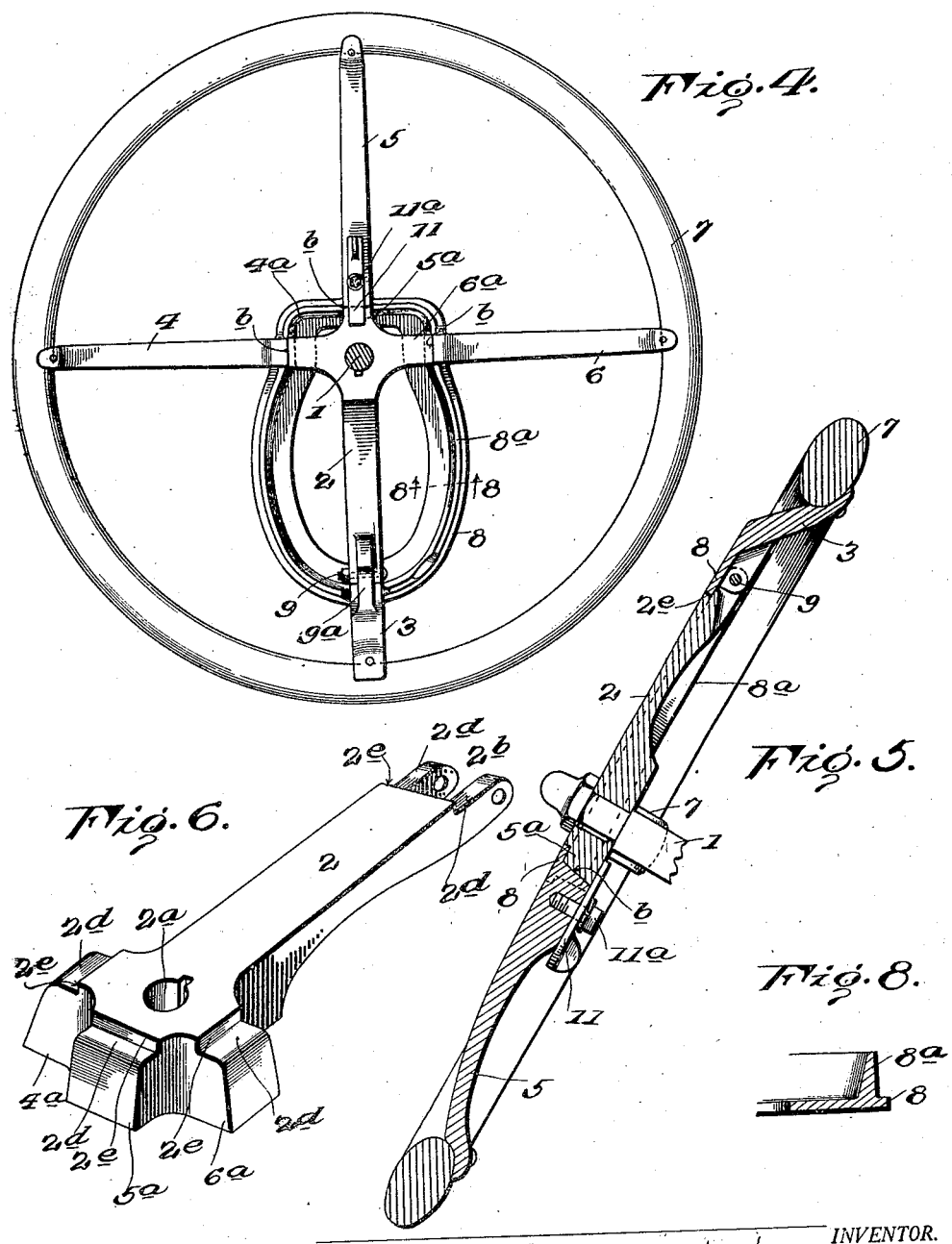

Patented Jan. 6, 1925.

1,521,707

UNITED STATES PATENT OFFICE.

ABRAM D. OSTERHOUT, OF UTICA, NEW YORK.

MOTOR-VEHICLE STEERING WHEEL.

Application filed January 10, 1921. Serial No. 436,221.

*To all whom it may concern:*

Be it known that I, ABRAM D. OSTERHOUT, a citizen of the United States of America, and a resident of Utica, county of Oneida and State of New York, have invented certain new and useful Improvements in and Relating to Motor-Vehicle Steering Wheels, of which the following is a specification.

This invention relates to certain improvements in steering wheels for motor and other vehicles; and the objects and nature of the invention will be readily understood by those skilled in the art in the light of the following explanations of the accompanying drawings, illustrating what I now believe to be the preferred mechanical expression or embodiment of my invention from among other forms, constructions and arrangements within the spirit and scope thereof.

It is an object of the invention to provide strong, durable, simple and easily operated improvements in tilting or hinged steering wheels, and with this and other objects in view, my invention consists in certain novel features in construction, and in combinations and arrangements as more fully and particularly set forth and specified hereinafter.

Referring to the accompanying drawings:—

Fig. 4 is a bottom plan of the wheel in operative or normal adjustment, the steering post appearing in cross section.

Fig. 5 is a section on the line 5—5, Fig. 1.

Fig. 6 is a detail perspective view of the steering post head disconnected from the tilting steering wheel and from the steering post.

Fig. 8 is a detail cross section on the line 8—8, Fig. 4.

Figure 1:
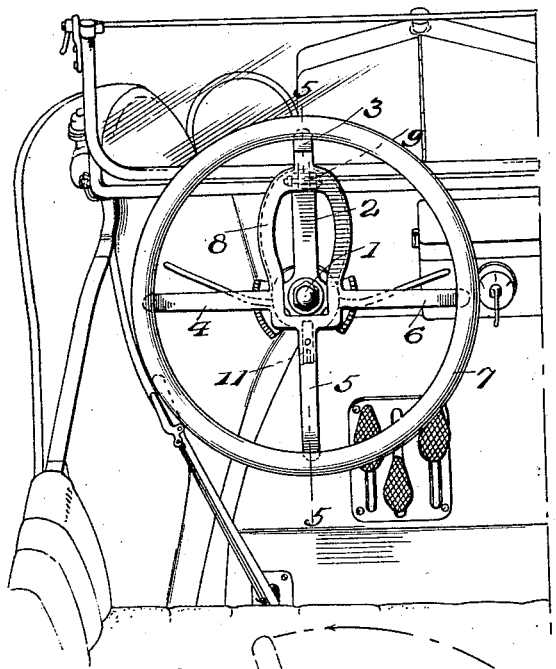
Fig. 1, is a perspective of a portion of a motor vehicle, showing a wheel embodying my invention, in top plan, and in operative adjustment.
Figure 7:
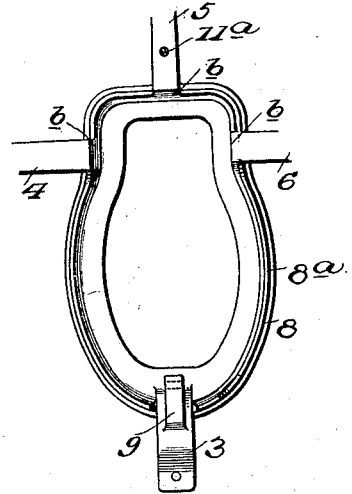
Fig. 7 is a detail bottom plan view of the loop portion of the spider frame of the steering wheel, certain of the spider arms being broken away, the spider frame being shown detached from the steering post head.
Figure 2:
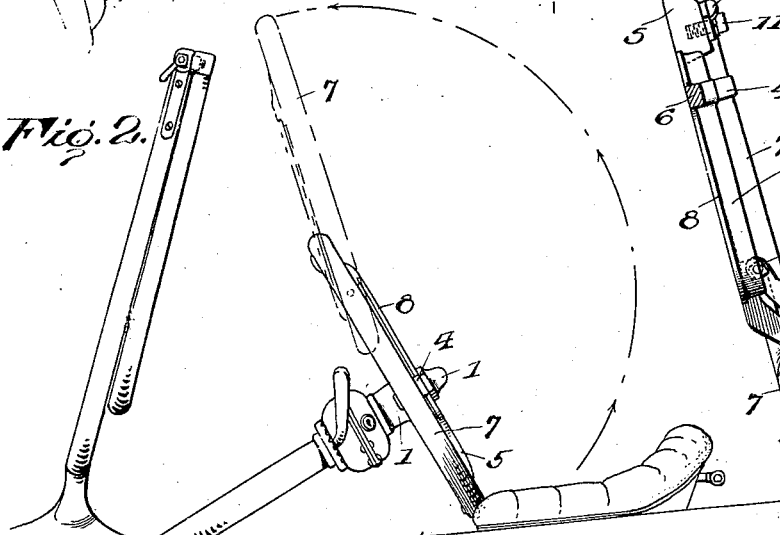
Fig. 2 shows the wheel in edge elevation, dotted lines showing the wheel in tilted or inoperative position.

In the particular example illustrated by the accompanying drawings, I show any suitable or ordinary motor vehicle steering post 1 which is rotated by the steering wheel to control the direction of or, in other words, to guide the vehicle.

The steering wheel is carried by the upper end of the post, and in this instance, said wheel comprises a steering post head, block, or a hub member which is fixed to the post and through the medium of which the wheel is coupled to the post and rotates the same, and a rim and spider member hinged or pivotally coupled to the head block and which provides the hand hold for the operator.

The head block, of the steering post, or the hub member, consists of a strong rigid block, bar or arm 2, at one end having the vertical (transverse) opening 2ª forming the bore to receive the upper end of the post whereby said bar can be fixed to the post to rotate the same.

In this example, the elongated block 2 is fixed to the post to form what might be termed a radial crank arm, normally extending forwardly from the post in a plane at right angles to the axial line of the post. The spider frame of the wheel rim is pivotally joined to the free or front end of this elongated block 2, and said spider frame is formed to close down on and to receive this block when the wheel is in normal operative adjustment.

In the example illustrated, the spider frame is formed in one piece of suitable metal, by casting or otherwise, and embodies the several rigid arms 3, 4, 5, 6, radiating from a common center, and at the top sides of their outer ends formed to receive the annulus or rim 7 which is fixed to said arms in the usual or any suitable manner, and which forms the hand hold or grip of the wheel. The center of the spider is composed of a strong rigid continuous encircling open center frame or loop 8 integral with the arms and from which the arms radiate, although this center loop is elongated along the radial line of the arm 3 and hence is eccentric with respect to the true center of the rim 7, i. e. the longitudinal axial line of the steering post 1.

This loop frame 8 is preferably approximately T shape in cross section to provide a comparatively wide top plate having a depending vertical flange or web 8ª. The loop frame 8 is elongated along the radius of arm 3 to within a comparatively short space from the rim 7, and this space is bridged by the short arm 3. The spider is hinged to the post head block 2 to swing on a transverse hinge or pivot pin 9 located beneath the top plate of the loop frame 8 and approximately at the junction between the arm 3 and the loop 8. In this instance, the under sides of the arm 3 and adjacent portion of the loop 8 are formed with a depending lug or rib 9ª, alined with the longitudinal axis of head block 2. The free end of the head block is longitudinally bifurcated, (see 2ᵇ, Fig. 6) to straddle lug 9ª, and the pivot pin 9 extends transversely through the legs of the bifurcation and the lug and establishes the hinge connection between the wheel spider and the head block.

The loop frame 8 (when the wheel is in operative position) surrounds and fits down on the steering post head block 2. When the parts are in this position, the depending flange of the loop surrounds the head block and the top plate of the loop overhangs and closes down on the opposite end portions of the block and these end portions are formed with depressed seats 2ᶜ to receive the top plate of the loop and to bring the top surfaces of the head block and loop approximately flush. This formation provides vertical edge shoulders 2ᵉ to engage the inner edge of the top plate of the loop and aid in bracing the head block and loop against independent lateral play. The hub or lower end portion of the head block 2 provides (in this particular example) three radiating projections or lugs 4ª, 5ª, 6ª, having beveled outer end faces to abut the correspondingly beveled inner ends $b$ of the arms 4, 5, 6, when the wheel parts are in operative adjustment. When the wheel is in operative adjustment, the projections or lugs 4ª, 5ª, 6ª, are alined with the arms 4, 5, 6, respectively, and said parts directly abut and thereby strongly brace the spider and head block against relative looseness, producing a strong tightly fitting structure.

It will be noted, that the open loop 8 of the spider, in length exceeds the length of the head block 2 and that its width exceeds that of the head block, and that the longitudinal side lengths of the loop are bowed or curved outwardly to form arch like braces between the opposite end portions of the loop, thereby providing an exceedingly strong construction to withstand the twisting strains and stresses to which the loop is subjected when the wheel is being rotated and held during motor vehicle operation.

Figure 3:
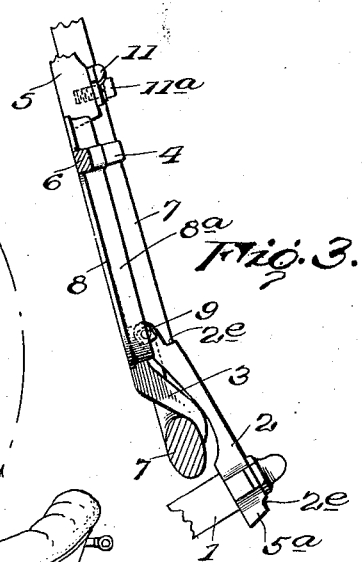
Fig. 3 is a vertical section through a portion of the wheel when in tilted or inoperative adjustment.

In the normal position of the wheel, the head block 2 extends upwardly from the steering post (Fig. 1) and the hinge pivot 9 is located near the topmost portion of the rim 7. When the parts are thus arranged, the rim and its spider (the wheel) can be swung upwardly and forward, on axis 9 as a center, through an arc of almost one hundred and eighty degrees. The limit of upward and forward swing of the wheel is established by the engagement of what is normally the under or forward edge of the spider arm 3 with the under (forward) side of the head block 2 (Fig. 3). When the wheel is thus in tilted or inoperative position, the center of gravity of the wheel is located in a vertical plane in advance of the vertical plane in which the hinge axis 9 is located, while the lowermost portion of the rim 7 is below or in advance of head block 2 and a short distance above the steering post. The wheel, when in this position is located above the steering post and in advance of the head block 2, and hence is entirely removed from position to interfere with the driver in passing to and from the driver's seat.

When in tilted or elevated position, the joint between the head block and wheel (spider and its rim) is braced against undue lateral play and movement, by the legs 2ᵈ of the head block straddling the lug 9ª of the wheel. The wheel can be easily restored to operative position by swinging the same down and back fitting and enclosing the head block.

The wheel is normally locked to and on the head block, by a suitable latch which I show in the form of a simple turn button 11, arranged at the under side of the spider arm 5, and pivotally confined thereto by headed machine screw 11ª. This turn button is of a length to swing under the under surface of the lower end 5ª of the head block, when the wheel is in normal position, (see Fig. 5) and thus prevent upward swing or tilting of the wheel.

When the wheel is to be tilted, the driver swings the turn button to a transverse position with its ends clear of the head block, whereupon the button offers no resistance against tilting of the wheel.

It is evident that various changes, modifications and variations might be resorted to without departing from the spirit and scope of my invention and hence I do not wish to limit myself to the exact disclosures hereof.

What I claim is:—

1. A steering post head block formed at one end to be fixed to a steering post and provided with lateral opposite side projections and an end projection disposed radially with respect to the steering post, the opposite end of said block providing a free end portion remote from the post, in combination with a tilting steering wheel comprising, a frame including a rigid elongated loop extending from the central portion of the frame, said loop having a horizontally disposed top flange and a vertically disposed flange depending from the outer edge portion thereof, and arms extending radially from the opposite sides and end of the inner end portion of the depending flange of said loop, said frame pivotally mounted at the outer end of said loop to the free end portion of said head block for vertical swinging movement, and the inner end of said loop formed to fit over and laterally surround the inner end of said block with said side and end projections alined with and abutting the inner ends of said radial arms and the top flange of said loop bearing upon said projections to support the wheel frame in operative position.

2. The combination with a steering post head block formed to be fixed to a steering post and having lateral projections forming abutments radially disposed with respect to the steering post, of a tilting steering wheel pivotally mounted on said block, said wheel embodying a frame consisting of an elongated rigid loop and arms extending laterally and radially therefrom, said loop having a depending vertically disposed flange portion at which the inner ends of said arms terminate to form abutments, the said loop formed to fit down over and surround said head block with the radial frame arms alined with and the inner ends thereof abutting said radially disposed block projections whereby turning forces applied to said wheel are transmitted directly through said arms and head block projections to the steering post, the said block projections forming seats upon which said frame loop rests to support the wheel frame in operative position.

ABRAM D. OSTERHOUT.